US011448547B2

(12) United States Patent
Dokken et al.

(10) Patent No.: US 11,448,547 B2
(45) Date of Patent: Sep. 20, 2022

(54) CONTAINER WEIGHING SYSTEM METHOD AND APPARATUS

(71) Applicant: Bourgault Industries Ltd., St. Brieux (CA)

(72) Inventors: Joel Dokken, Aberdeen (CA); Derek Walter, Aberdeen (CA); Montgomerie Summach, Saskatoon (CA)

(73) Assignee: Bourgault Industries Ltd., St. Brieux (CA)

( * ) Notice: Subject to any disclaimer, the term of this patent is extended or adjusted under 35 U.S.C. 154(b) by 42 days.

(21) Appl. No.: 16/941,774

(22) Filed: Jul. 29, 2020

(65) Prior Publication Data

US 2021/0033449 A1 Feb. 4, 2021

Related U.S. Application Data

(60) Provisional application No. 62/882,128, filed on Aug. 2, 2019.

(51) Int. Cl.
*G01G 19/12* (2006.01)
*G01G 19/24* (2006.01)
*G01G 21/28* (2006.01)
*G01G 17/00* (2006.01)
*G01G 19/393* (2006.01)
*G01G 21/24* (2006.01)

(52) U.S. Cl.
CPC ............ *G01G 19/12* (2013.01); *G01G 19/393* (2013.01); *G01G 21/24* (2013.01); *G01G 17/00* (2013.01); *G01G 21/28* (2013.01)

(58) Field of Classification Search
CPC ....... G01G 19/12; G01G 19/393; G01G 21/24; G01G 17/00; G01G 21/28
See application file for complete search history.

(56) References Cited

U.S. PATENT DOCUMENTS

| 4,249,623 | A | 2/1981 | McCauley |
| 5,230,392 | A | 7/1993 | Tremblay |
| 5,369,222 | A | 11/1994 | Strelioff |
| 5,635,680 | A | 6/1997 | Dojan |

(Continued)

FOREIGN PATENT DOCUMENTS

CA 2958797 A1 9/2017

*Primary Examiner* — Randy W Gibson
(74) *Attorney, Agent, or Firm* — Bereskin & Parr LLP/S.E.N.C.R.L., s.r.l.

(57) ABSTRACT

A mobile apparatus for carrying and weighing a load includes a mobile frame supported by a plurality of wheels. At least one container is supported on the mobile frame for carrying a load. A plurality of sensor assemblies are coupled between the frame and the container, the sensor assemblies resistive to a weight force exerted by the container towards the frame in a generally vertical sensing direction for sensing a weight of the load, and the sensor assemblies non-resistive to error forces exerted generally orthogonally to the sensing direction for filtering out the error forces from the sensed weight. A stabilizing assembly is coupled between the container and the frame, the stabilizing assembly freely accommodating transfer of the force exerted by the container towards the frame in the sensing direction, and simultaneously inhibiting shifting of the container relative to the frame in one or more shifting directions perpendicular to the sensing direction.

20 Claims, 14 Drawing Sheets

(56) References Cited

U.S. PATENT DOCUMENTS

| | | | |
|---|---|---|---|
| 5,773,768 A | 6/1998 | Nuyts | |
| 6,013,880 A | 1/2000 | McFarlane et al. | |
| 7,009,118 B2 | 3/2006 | Pottebaum et al. | |
| 7,538,281 B2 * | 5/2009 | Pottebaum | G01G 19/12 |
| | | | 177/211 |
| 7,893,366 B2 * | 2/2011 | Gaalswyk | G01G 13/12 |
| | | | 177/116 |
| 8,354,602 B2 | 1/2013 | Lucas et al. | |
| 10,288,473 B2 | 5/2019 | Brandt | |

\* cited by examiner

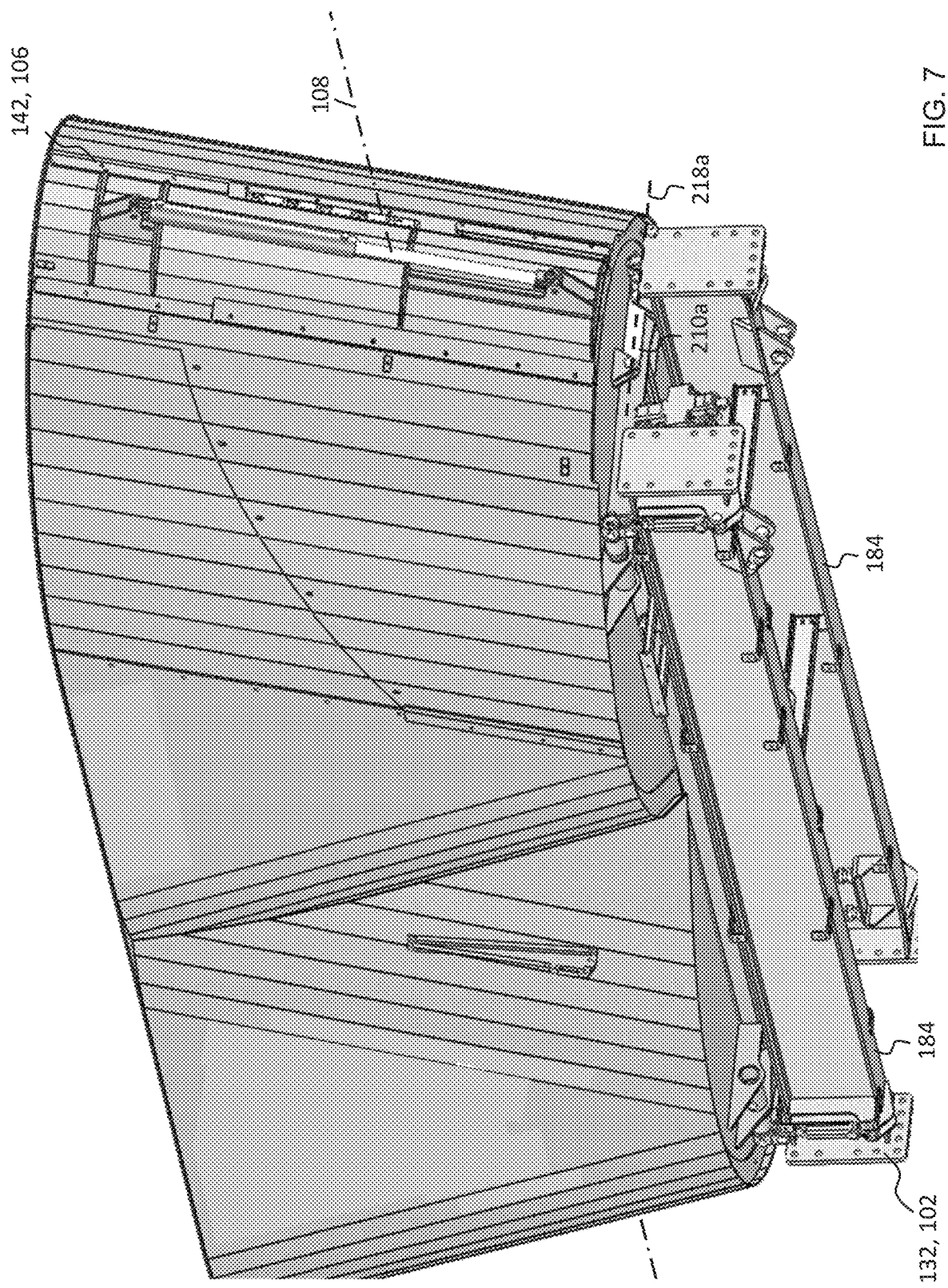

US 11,448,547 B2

CONTAINER WEIGHING SYSTEM METHOD AND APPARATUS

This application claims the benefit of U.S. Provisional Application Ser. No. 62/882,128, filed Aug. 2, 2019, which is hereby incorporated herein by reference.

FIELD

The specification relates generally to apparatuses and methods associated with measuring the weight of a container, and more specifically, to a container supported on a mobile frame with one or more load cells disposed therebetween.

BACKGROUND

U.S. Pat. No. 6,013,880 (McFarlane et al) purports to disclose a material supporting apparatus for supporting and permitting delivery of the materials. The apparatus includes a chassis having a first and a second end. A container is mounted upon the chassis and a stabilizing device is interconnected between the container and the chassis. The stabilizing device is disposed between the container and the chassis for stabilizing the container relative to the chassis. A restraining mechanism extends between the chassis and the container for permitting limited vertical movement of the container relative to the chassis. Also, a weight sensing arrangement is disposed between the container and the chassis for sensing the weight of the container and the materials added thereto and for determining therefrom the weight of the materials within the container. Additionally, a coupling device is disposed between the chassis and the container and positioned remote from the stabilizing device for assisting the stabilizing of the container relative to the chassis.

U.S. Pat. No. 5,635,680 (Dojan) purports to disclose an onboard weighing system for a vehicle in which the load is carried by a load frame which during the transport mode rests on the vehicle support frame and for weighing, after the vehicle has come to a stop, a force is applied to raise the load frame off the vehicle support frame and onto a load cell so that the load cell will produce a signal indication of the weight of the load. As a feature the load cell is pivotally mounted in gimbal rings to compensate for any pitch or roll angles due to tilting of the vehicle and/or the load frame. As yet another feature a mechanism is provided to securely but releasably lock the load or weigh frame onto the vehicle support frame during the transport mode U.S. Pat. No. 7,009,118 (Pottebaum et al) purports to disclose a load cell operable with a vehicle having a chassis and a container carried by the chassis, with the load cell supported by the chassis and supporting the container for measuring the weight of the container and any load therein, and to a system having a plurality of these load cells on a vehicle, and to a method of executing weight measurements of loads in a container of a vehicle. The load cell includes a plurality of strain gauges and coupling elements in a floating mount configuration for coupling the load cell to the container and to the chassis in a dual shear beam loading configuration, while limited translational movement is permitted of the load cell relative to the container or the chassis. The load cell also has an electrical interface for receiving analog output data from the strain gauges, adaptively filtering this data and outputting a digital signal representative of the weight of the container and any load therein. This invention purports to permit measurement of incremental loads with sufficient accuracy to permit customer billing based on the measurements.

SUMMARY

The following summary is intended to introduce the reader to various aspects of the applicant's teaching, but not to define any invention.

A mobile apparatus for carrying and weighing a load includes (a) a mobile frame supported by a plurality of wheels; (b) at least one container supported on the mobile frame for carrying a load; (c) a plurality of sensor assemblies coupled between the frame and the container, the sensor assemblies resistive to a weight force exerted by the container towards the frame in a generally vertical sensing direction for sensing a weight of the load, and the sensor assemblies non-resistive to error forces exerted generally orthogonally to the sensing direction for filtering out the error forces from the sensed weight; and (d) a stabilizing assembly coupled between the container and the frame, the stabilizing assembly freely accommodating transfer of the force exerted by the container towards the frame in the sensing direction, and simultaneously inhibiting shifting of the container relative to the frame in one or more shifting directions perpendicular to the sensing direction.

In some examples, each sensor assembly includes a load cell having a cell first end, and a connector link having a link first end coupled to the cell first end at a first joint. In some examples, the connector link has a link axis and a link second end spaced apart from the link first end along the link axis by a link length, the link second end pivotally connected to a first one of the frame and container at a second joint.

In some examples, the second joint is configured to resist movement of the connector link in the sensing direction relative to the first one of the frame and the container, and to accommodate movement of the load cell relative to the second joint resulting from bending of the frame relative to the container. In some examples, the first joint is configured to resist movement of the connector link in the sensing direction relative to the first one of the frame and the container, and to accommodate movement of the load cell relative to the second joint resulting from bending of the frame relative to the container.

In some examples, the load cell has a cell axis and a cell second end spaced apart from the cell first end along the axis, the cell second end coupled to a second one of the frame and container, the second one different than the first one. In some examples, the cell axis of the load cell of each sensor assembly is oriented orthogonal to the sensing axis. In some examples, the frame extends lengthwise along a longitudinal axis, and the cell axis of the load cell of each sensor assembly is oriented parallel to the longitudinal axis.

In some examples, the link axis of the connector link of each sensor assembly is parallel to the sensing axis.

In some examples, the stabilizing assembly comprises at least one tie, each of the at least one tie having a tie length extending between a tie first end and a tie second end spaced apart from the tie first end along a tie axis, the tie axis oriented orthogonal to the sensing axis with the tie first end coupled to the frame and the tie second end coupled to the container, wherein shifting of the container relative to the frame in a direction parallel to the tie axis is inhibited.

In some examples, the first tie end is coupled to the frame via a first tie pivot joint, and the second tie end is coupled to the container via a second tie pivot joint, each of the first and second tie pivot joints defining a respective horizontal first and second tie pivot axis oriented orthogonal to the tie axis, wherein pivoting of the tie about tie pivot axes freely accommodates transfer of the force from the container toward the frame in the sensing direction.

In some examples, the at least one tie includes a first lateral tie, the tie axis of the first lateral tie extending orthogonal to the longitudinal direction, wherein shifting of the container relative to the frame in the lateral direction is inhibited by the first lateral tie. In some examples, the first lateral tie is disposed adjacent a forward end of the frame. In some examples, the at least one tie includes a second lateral tie oriented parallel to the first lateral tie, the second lateral tie disposed adjacent a rearward end of the frame.

In some examples, the at least one tie includes a first longitudinal tie, the tie axis of the first longitudinal tie oriented parallel to the longitudinal axis, wherein shifting of the container relative to the frame parallel to the longitudinal axis is inhibited by the first longitudinal tie.

In some examples, the load cell is a bending beam load cell.

According to some aspects, a method of preparing a feedstock ration having a plurality of ingredients includes (a) loading a first ingredient into a container supported on a mobile frame, wherein a plurality of sensor assemblies are coupled between the frame and the container for measuring a weight of contents of the container by sensing a force exerted by the container towards the frame in a generally vertical sensing direction; (b) during step (a), monitoring a first weight of the first ingredient in the container as indicated by the sensing assemblies, and comparing the monitored first weight to a target first weight corresponding to an amount of the first ingredient required for the feedstock ration; (c) when the first weight reaches the target first weight, stopping the loading of the first ingredient into the container; and (d) after step (c), repeating steps (a)-(c) for a second ingredient in place of the first ingredient.

In some examples, the method further includes repeating steps (a) to (c) for subsequent ingredients, until each of the plurality of ingredients have been added to the feedstock.

In some examples, the method further includes moving the mobile frame to a first location prior to loading the first ingredient into the container, and after step (c) and before step (d), moving the mobile frame to a second location remote from the first location prior to loading the second ingredient into the container.

In some examples, each sensor assembly comprises a load cell, and during the loading of ingredients in step (a), each sensor assembly resists the force exerted by the container towards the frame for transferring the force to the load cell, and each sensor assembly freely accommodates forces orthogonal to the sensing direction to isolate the load cell from error forces.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 7 is a front right perspective view of the mobile apparatus of FIG. 1, with the wheels removed;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
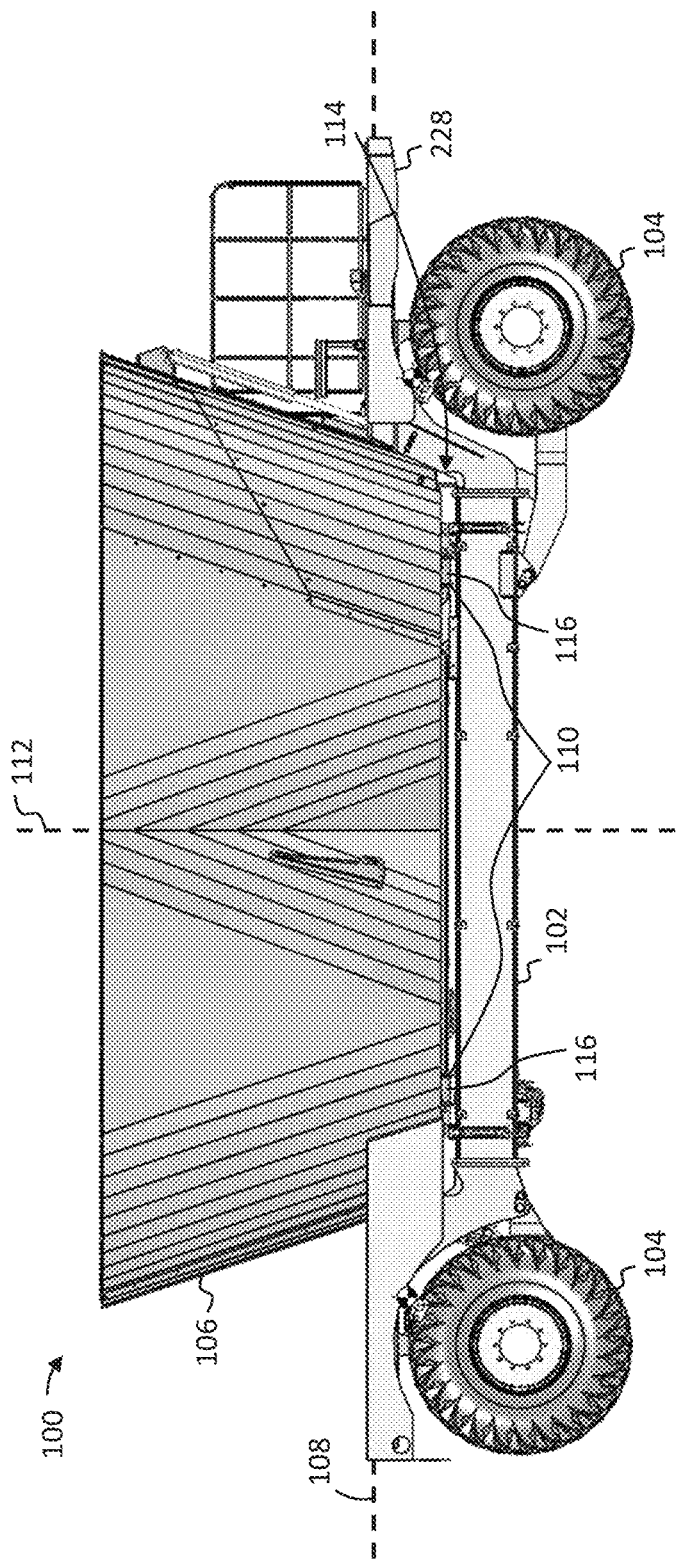
FIG. 1 is a right side elevation view of an example mobile apparatus.

Referring to FIG. 1, an example of a mobile apparatus 100 for carrying and weighing a load includes a mobile frame 102 supported by a plurality of wheels 104. At least one container 106 is supported on the mobile frame 102 for carrying a load. The frame 102 extends lengthwise along a longitudinal axis 108 between forward and rearward ends of the frame.

The mobile apparatus 100 includes a plurality of sensor assemblies 110 coupled between the frame 102 and the container 106. Each sensor assembly, in the example illustrated, includes a load cell 116. The sensor assemblies 110 are resistive to a weight force exerted by the container 106 towards the frame 102 in a generally vertical sensing direction 112 for sensing a weight of the load. The sensor assemblies 110 are non-resistive to horizontal forces exerted generally orthogonally to the sensing direction 112.

The mobile apparatus 100 further includes a stabilizing assembly 114 coupled between the container 106 and the frame 102. The stabilizing assembly 114 inhibits shifting of the container 106 relative to the frame 102 in at least a first shifting direction generally perpendicular to the sensing direction, while simultaneously permitting force transfer from the container 106 toward the frame 102 in the sensing direction.

In the illustrated example, the stabilizing assembly 114 freely accommodates transfer of the force exerted by the container 106 towards the frame 102 in the sensing direction 112 to facilitate accurate sensing of the weight by the sensor assemblies 110. At the same time, the stabilizing assembly 114 inhibits shifting of the container 106 relative to the frame 102 in a generally horizontal plane orthogonal to the vertical sensing direction. Inhibiting such shifting can help hold the container 106 in place on the frame 102 during, for example, movement of the frame over a ground surface. Inhibiting such shifting can also or alternatively help to protect the load cells 116 from forces which could damage the load cells.

Furthermore, the inventors determined that horizontal forces acting on conventionally-mounted load cells act as error forces in that they are not indicative of weight but can nevertheless stress the load cells, causing inaccuracy in the weight measurement of the load cells. The stabilizing assembly 114 helps isolate the load cells from many such error forces, with a corresponding increase in accuracy of the measured weight. But even with the stabilizing assembly 114 in place, the inventors found some additional error forces to persist, and found that this resulted from bending of the frame 102. In particular, the inventors determined that bending of the frame 102, including bending about an axis parallel to the longitudinal axis, bending about an axis perpendicular to the longitudinal axis, or twisting about one or more axes, was found to exert horizontal error forces on conventionally-mounted load cells of sufficient magnitude to interfere with accurately weighing the contents of the container. Bending of the frame was determined to be caused by various factors, including for example, parking the mobile apparatus 100 on uneven terrain. The resulting error forces are, according to this disclosure, inhibited from affecting the measurements made by the load cells of the sensor assemblies 110 which are non-resistive to error forces exerted generally orthogonally to the sensing direction 112. Providing both the stabilizing assembly 114 to resist horizontal forces urging displacement of the container relative to the frame, and the sensor assemblies 110 which are non-resistive to horizontal error forces, facilitates accuracy of the weight measurement of the load in the container.

This can be particularly helpful when measuring the weight increase of the addition of a relatively small amount of an ingredient of the feed ration. For example, some feed rations require small amounts of certain ingredients, such as, for example, 20 kg or less of nutritional supplements or other additives. The small amount of such ingredient can be part of a complete mixture in the container having a total weight of 5,000 kg or more. Using an earlier mobile apparatus with a container on a frame and conventionally-mounted load cells, bending of the frame was found to exert horizontal error forces on the load cells of sufficient magnitude to interfere with the ability to accurately weigh the 20 kg ingredient being added to the container. With an apparatus according to the teaching disclosed herein, accurate measurement of the 20 kg ingredient was possible.

Figure 2:
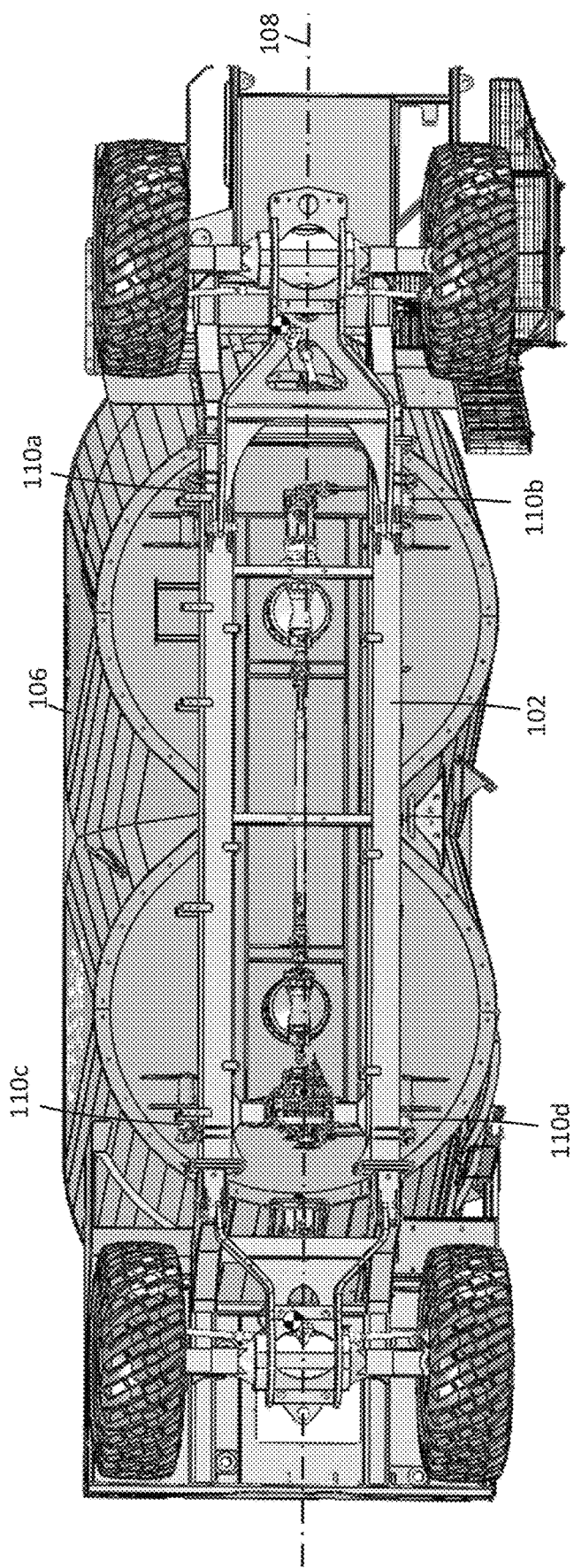
FIG. 2 is a bottom plan view of the mobile apparatus of FIG. 1.

Referring to FIG. 2, in the example illustrated, the plurality of sensor assemblies 110 includes four sensor assemblies 110, with one sensor assembly 110 adjacent each corner of mobile apparatus 100. In particular, in the example illustrated, the four sensor assemblies include a forward right sensor assembly 110a, a forward left sensor assembly 110b, a rear right sensor assembly 110c, and a rear left sensor assembly 110d.

Figure 3:
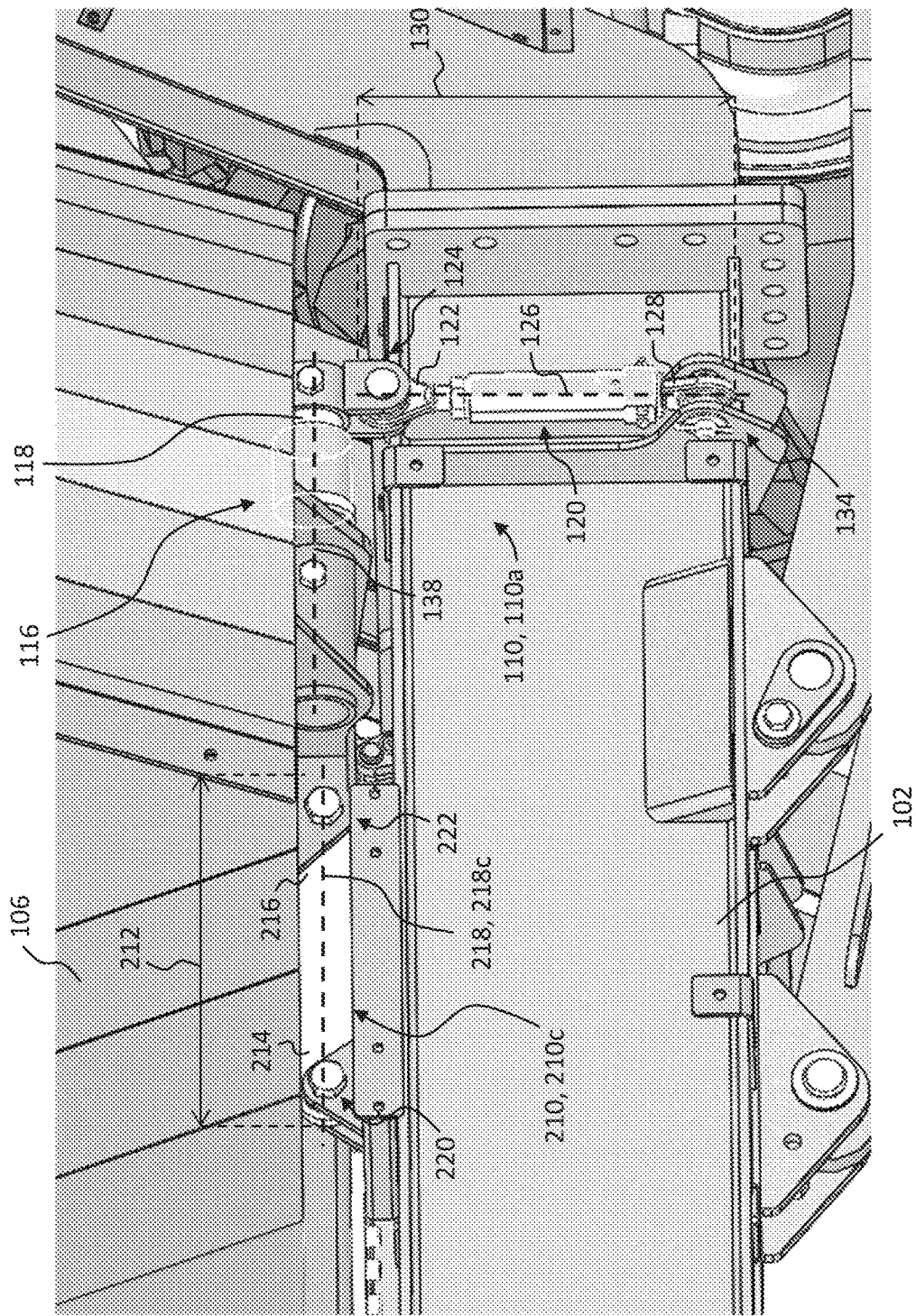
FIG. 3 is an enlarged perspective view of a front right portion of the mobile apparatus of FIG. 1.
Figure 4:
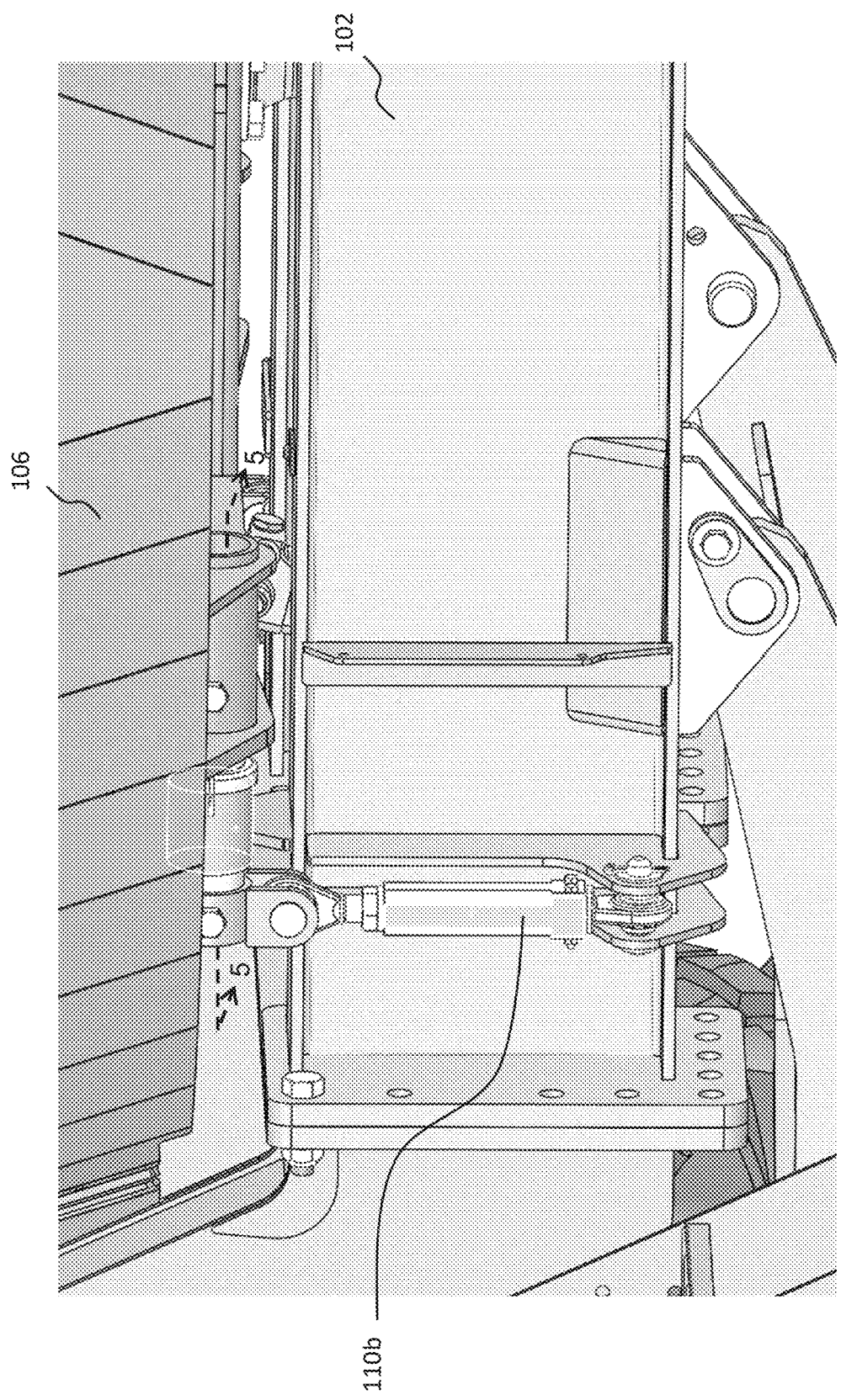
FIG. 4 is an enlarged perspective view of a rear right portion of the mobile apparatus of FIG. 1.

Referring to FIG. 3, each sensor assembly 110 of the illustrated example includes a load cell 116 having a cell first end 118, and a connector link 120 having a link first end 122 coupled to the cell first end 118 at a first joint 124. In the example illustrated, the load cell 116 is a bending beam load cell extending along a cell axis 138.

In the example illustrated, the connector link 120 has a link axis 126 and a link second end 128 spaced apart from the link first end 122 along the link axis 126 by a link length 130. In the example illustrated, the link length 130 is about 370 mm. The link second end 128 is, in the example illustrated, pivotably connected to a first one of the frame 102 and the container 106 at a second joint 134. In the example illustrated, the link second end 128 is pivotably connected to the frame 102 at the second joint 134.

The first joint 124 is configured to resist movement of the link first end 122 in the sensing direction 112 relative to the first one of the frame 102 and the container 106 (i.e. relative to the frame 102 in the example illustrated), and to freely accommodate movement of the load cell 116 relative to the second joint 134 in a direction generally orthogonal to the sensing direction resulting from bending of the frame 102 relative to the container 106.

The second joint 134 is configured to resist movement of the link second end 128 in the sensing direction 112 relative to the first one of the frame 102 and the container 106 (i.e. relative to the frame 102, in the example illustrated), and to freely accommodate movement of the load cell 116 relative to the second joint 134 in a direction generally orthogonal to the sensing direction resulting from bending of the frame 102 relative to the container 106.

Figure 5:
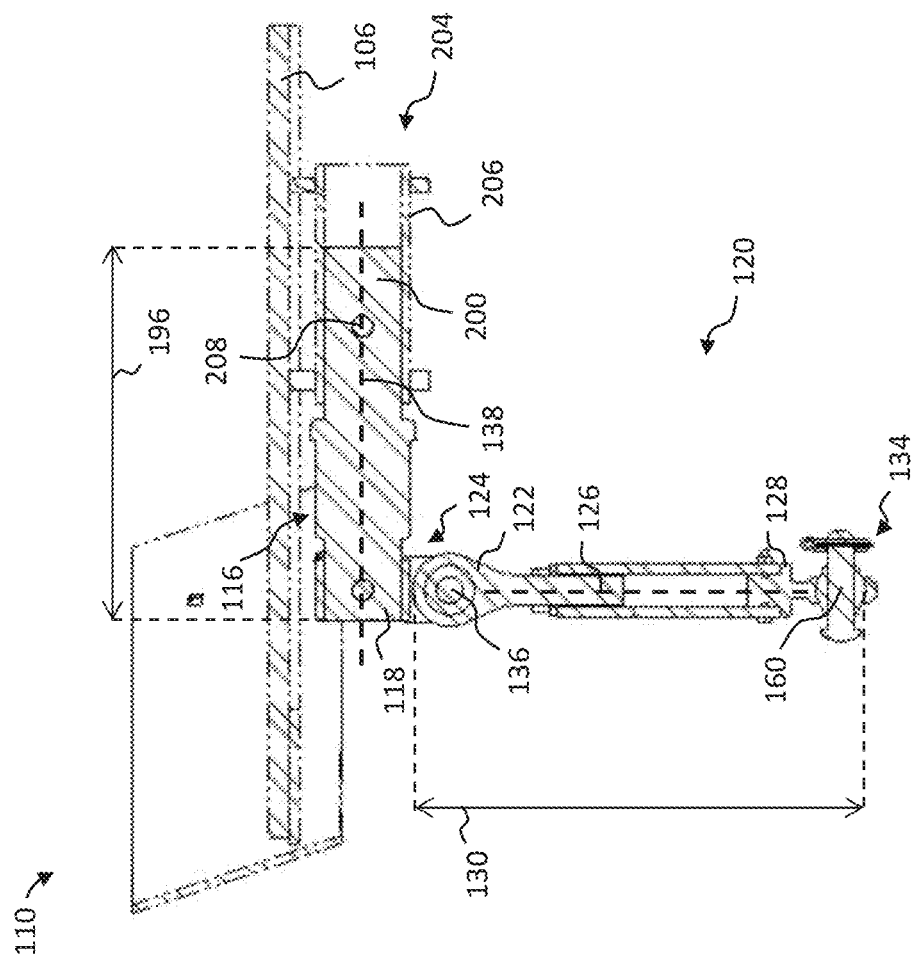
FIG. 5 is a cross-sectional view of a sensor assembly of the mobile apparatus of FIG. 1, taken along line 5-5 of FIG. 4.
Figure 6:
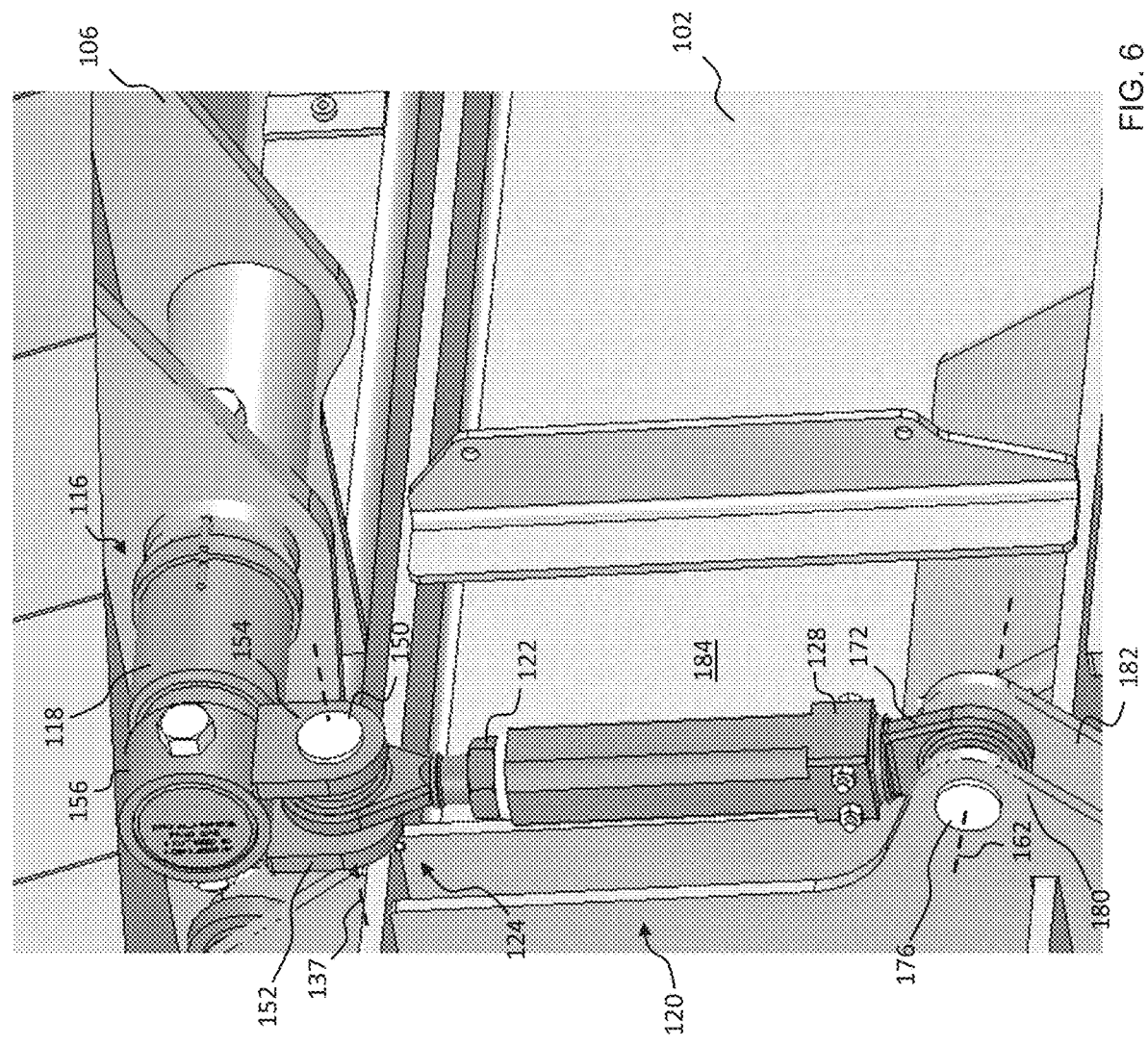
FIG. 6 is an enlarged perspective view of a portion of the structure of FIG. 4.
Figure 6A:
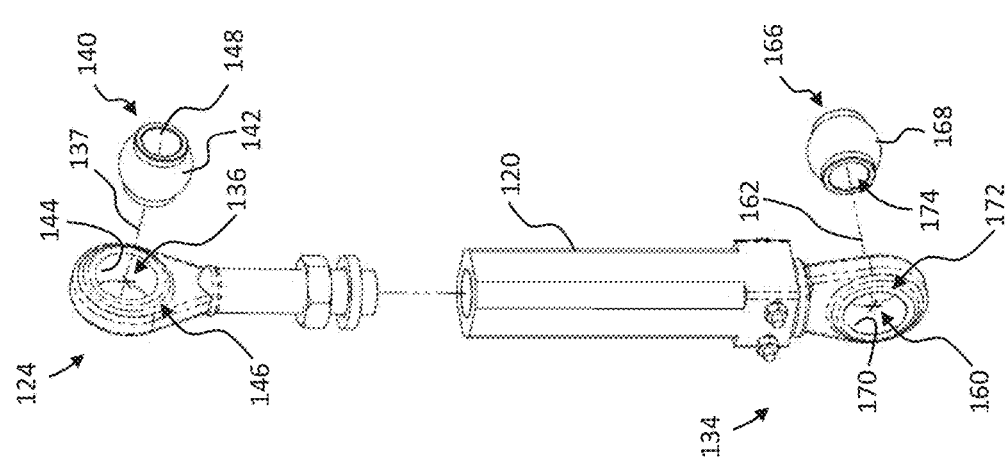
FIG. 6A is an exploded view of a portion of the structure of FIG. 6.

With reference to FIG. 6 and FIG. 6A, the first joint 124 includes a first joint centerpoint 136 and a first joint axis 137 passing through the first joint centerpoint 136 (FIG. 5). The first joint centerpoint 136 is, in the example illustrated, supported at a constant elevation relative to the frame 102. The connector link 120 is pivotable about the first joint axis 137, and in the example illustrated, is pivotable relative to the load cell 116 about the first joint axis 137. In the example illustrated, the first joint axis 137 is oriented in a lateral direction, perpendicular to the longitudinal axis 108. Pivoting of the connector link 120 relative to the load cell about the first joint axis 137 facilitates the sensor assembly 110 to freely accommodate (be non-resistive to) bending of the frame 102, and at least bending of the frame about a laterally oriented bending axis.

In the example illustrated, the first joint 124 further includes a first joint bushing 140 having an outer spherical surface 142 that is retained in sliding engagement with an inner spherical surface 144 of a first joint bushing seat 146 fixed to the link first end 122. A first joint bore 148 (FIG. 6) passes through the first joint bushing 140, the first joint bore 148 coaxial with the first joint axis 137. A first joint pivot pin 150 (FIG. 6A) is received in the first joint bore 148. The pivot pin 150 is held in position relative to the load cell by a pair of mounting flanges 152, 154 extending from a collar 156 fixed to the first end 118 of the load cell 116.

The first joint bushing 140, assembled on the first joint pivot pin 150, is correspondingly held in position relative to the load cell 116. Movement of the bushing seat 146 of the first link end 122 relative to the spherical surface 142 of the first joint bushing 140 can further facilitate the sensor assembly 110 freely accommodating horizontal error forces to inhibit such forces from influencing the weight measurement returned by the sensor assembly 110.

The second joint 134 is similar in construction to the first joint 124, and the second joint 134 includes a second joint centerpoint 160 (FIG. 5) and a second joint axis 162 passing through the second joint centerpoint 160. The second joint centerpoint 160 is, in the example illustrated, in fixed position relative to the frame 102. The connector link 120 is pivotable about the second joint axis 162, and in the example illustrated, is pivotable relative to the frame 102 about the second joint axis 162. In the example illustrated, the second joint axis 162 is oriented in a longitudinal direction, perpendicular to the first joint axis 137, and parallel to the longitudinal axis 108. Pivoting of the connector link 120 relative to the frame 102 about the second joint axis 162 facilitates the sensor assembly 110 to freely accommodate (be non-resistive to) bending of the frame 102, and at least bending of the frame about a longitudinally oriented bending axis.

In the example illustrated, the second joint 134 further includes a second joint bushing 166 having an outer spherical surface 168 that is retained in sliding engagement with an inner spherical surface 170 of a second joint bushing seat 172 fixed to the link second end 128. A second joint bore 174 (FIG. 6A) passes through the second joint bushing 166, the second joint bore 174 coaxial with the second joint axis 162. A second joint pivot pin 176 (FIG. 6) is received in the second joint bore 174. The second joint pivot pin 176 is held in position relative to the frame 102 by a pair of second joint mounting flanges 180, 182 extending from a structural beam 184 of the frame 102.

The second joint bushing 166, assembled on the second joint pivot pin 176, is correspondingly held in position relative to the frame 102. Movement of the bushing seat 172 of the second link end 128 relative to the spherical surface 168 of the second joint bushing 166 can further facilitate the sensor assembly 110 freely accommodating horizontal error forces to filter out such forces from the weight measurement returned by the sensor assembly 110.

Referring to FIG. 5, in the illustrated example, the load cell 116 has a cell second end 200 spaced apart from the cell first end 118 along the axis 138 by a cell length 196. In the example illustrated, the cell length 196 is about 185 mm. The cell second end 200 is, in the example illustrated, coupled to a second one of the frame 102 and the container 106, the second one different than the first one. In the illustrated example, the cell second end 200 is coupled to the container 106, via a container mount 204. The container mount 204 is fixed to the container 106, and the second end 200 of the load cell 116 is fixed to the container mount 204.

In the example illustrated, the container mount 204 includes a mounting tube 206 coaxial with the load cell axis 138 and within which the second end 200 of the load cell 116 is slidably received. In the example illustrated, the mounting tube 206 is fixed to an underside of the container 106, for example, by welding. The second end 200 of the load cell 116 is inserted into the mounting tube 206 and fixed in place, for example, by a mounting bolt 208. Once secured, the second end 200 of the load cell 116 is immovable relative to the container 106.

Referring to FIG. 3, the cell axis 138 of the load cell 116 of each sensor assembly 110 is oriented parallel to the longitudinal axis 108 and orthogonal to the sensing axis 112. The link axis 126 of the connector link 120 of sensor assembly 110 is parallel to the sensing axis 112.

Referring again to FIG. 3, the stabilizing assembly 114 includes at least one tie 210. Each tie of the at least one tie 210 has a tie length 212 extending between a tie first end 214 and a tie second end 216 spaced apart from the tie first end 214 along a tie axis 218. The tie axis 218 of each tie 210 is oriented orthogonal to the sensing axis, with the tie first end 214 coupled to the frame 102 and the tie second end 216 coupled to the container 106. Each tie 210 inhibits shifting of the container 106 relative to the frame 102 in a direction parallel to the tie axis 218.

In the example illustrated, the tie first end 214 of each tie 210 is coupled to the frame 102 via a tie first pivot joint 220, and the tie second end 216 of each tie 210 is coupled to the container 106 via a tie second pivot joint 222. Each of the tie first and tie second pivot joints 220, 222 define a respective horizontal tie first and tie second tie pivot axis 224, 226 (FIGS. 9A and 9B) oriented orthogonal to the tie axis. Pivoting of the tie 210 about the tie pivot axes 224, 226 can help the stabilizing assembly 114 to accommodate force transfer from the container 106 toward the frame 102 in the sensing direction.

In the example illustrated, the at least one tie 210 includes a first lateral tie 210a (FIG. 7). The respective tie axis 218a of the first lateral tie 210a extends orthogonal to the longitudinal direction 108, wherein shifting of the container relative to the frame in the lateral direction is inhibited by the first lateral tie 210a. The first lateral tie 210a is, in the example illustrated, disposed adjacent a forward end of the frame 102.

Figure 8:
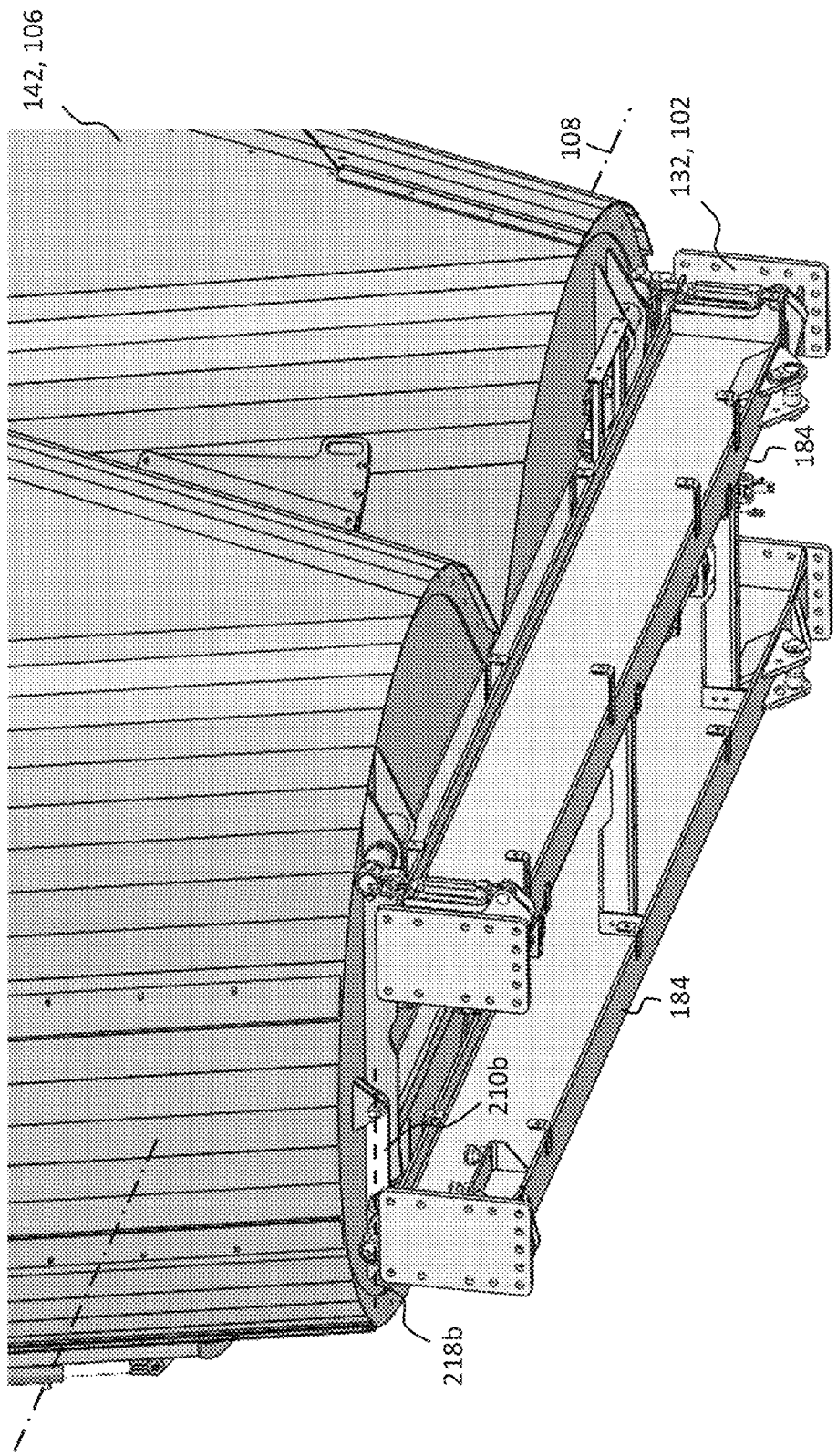
FIG. 8 is rear right perspective view of the mobile apparatus of FIG. 1, with the wheels removed.

In the example illustrated, the at least one tie 210 of the stabilizing assembly 114 further includes a second lateral tie 210b (FIG. 8). The second lateral tie 210b has its axis 218b oriented parallel to the first lateral tie 210a, and is disposed adjacent a rearward end of the frame 102.

In the example illustrated, the at least one tie of the stabilizing assembly 114 further includes a first longitudinal tie 210c (FIG. 3). The tie axis 218c of the first longitudinal tie 210c is oriented parallel to the longitudinal axis 108, wherein shifting of the container 106 relative to the frame 102 parallel to the longitudinal axis 108 is inhibited by the first longitudinal tie 210c.

Figure 9:
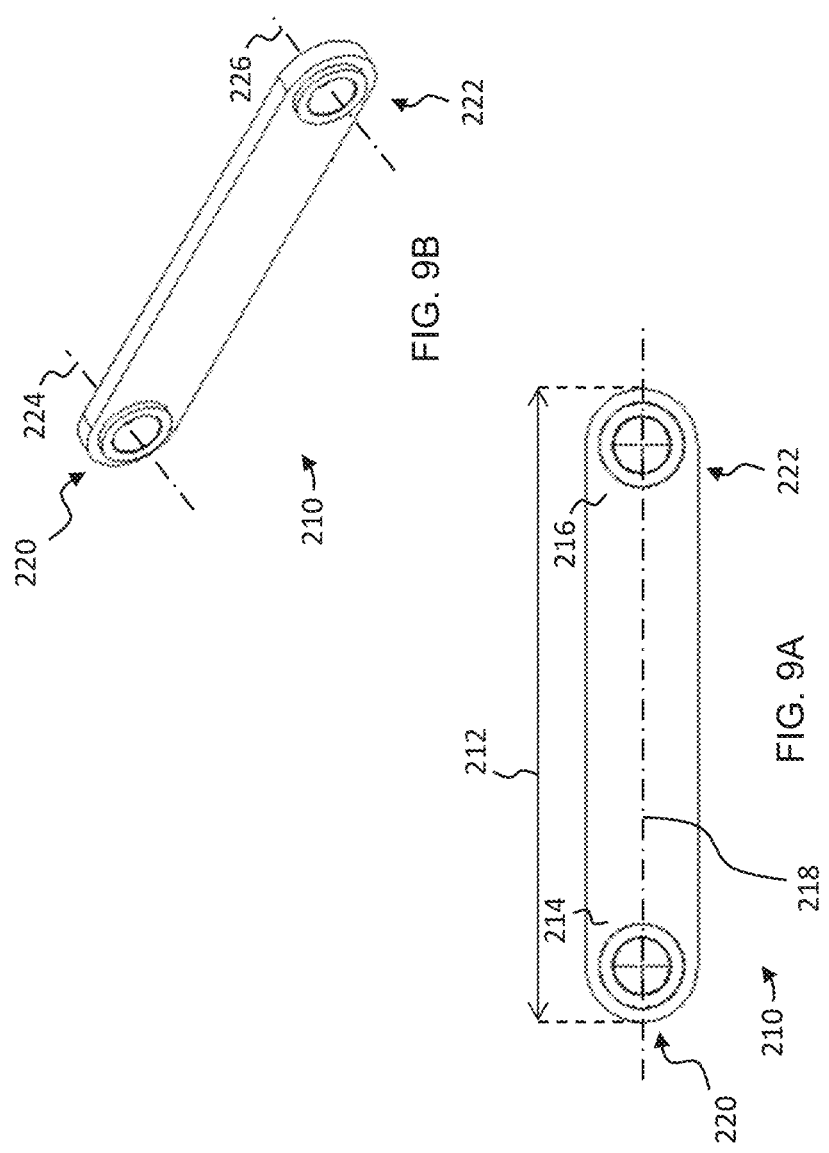
FIGS. 9A and 9B are a side view and a perspective view of a tie member of the mobile apparatus of FIG. 1.

Referring to FIGS. 9A and 9B, in the illustrated embodiment each tie 210 has a tie length 212. The tie length 212 is, in the example illustrated, about 350 mm.

Referring again to FIG. 1, in the example illustrated, the mobile apparatus 100 includes a tongue 228 extending from a forward end of the frame 102 for connection to a hitch of a tow vehicle, such as a tractor. In some examples, the mobile apparatus 100 may be self-propelled, including a motor and drive train supported by the frame 102 and coupled to the wheels for propulsion. In some examples, the mobile apparatus 100 includes a cab fixed to the frame for accommodating a human operator.

In some examples, the mobile apparatus includes a powered loader movably supported by the frame for loading material into the container 106. In some examples, the powered loader includes an arm with a scoop or claw at one end, and another end of the arm movably coupled to an arm base that is secured to the frame 102. The loader may include a conveyor belt mounted to one or both of frame 102 and container 106 and may include a scoop or a claw on a distal end of the arm to move material onto the conveyor belt to be carried to container 106 and deposited in container 106. A loading arm may impart a force to frame 102 or container 106, causing bending of the frame 102.

In some examples, the mobile apparatus includes a mixing system within container 106 to mix materials received in container 106. The mixing system, in some examples, includes a mixing member having a set of blades fixed to a vertical shaft projecting upward from a floor of the container 106, the vertical shaft rotatable about a vertical axis. The mixing system may include a plurality of mixing members spaced from one another within container 106 to help the mixing system to agitate material throughout container 106.

Figure 10:
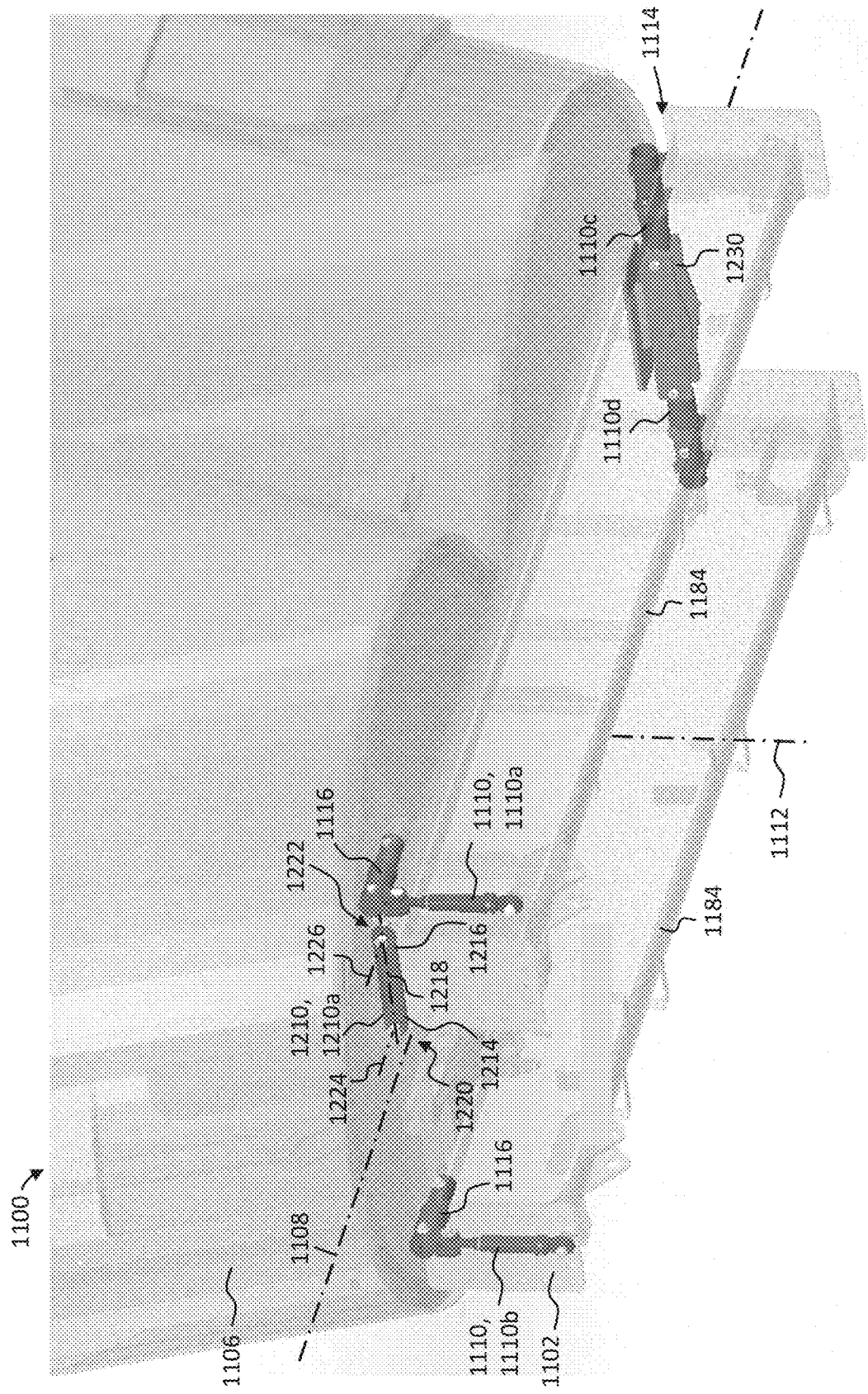
FIG. 10 is a rear right perspective view of another example of a mobile apparatus, with the wheels removed.

With reference to FIG. 10, another example of a mobile apparatus 1100 for carrying and weighing a load is illustrated. The mobile apparatus 1100 is similar in many respects to the mobile apparatus 100, and like features are identified by like reference characters, incremented by 1000.

The mobile apparatus 1100 includes a mobile frame 1102 supported by a plurality of wheels (not shown). At least one container 1106 is supported on the mobile frame 1102 for carrying a load. The frame 1102 extends lengthwise along a longitudinal axis 1108 between forward and rearward ends of the frame.

The mobile apparatus 1100 includes a plurality of sensor assemblies 1110 coupled between the frame 1102 and the container 1106. Each sensor assembly, in the example illustrated, includes a load cell 1116. The sensor assemblies 1110 are resistive to a weight force exerted by the container 1106 towards the frame 1102 in a generally vertical sensing direction 1112 for sensing a weight of the load. The sensor assemblies 1110 are non-resistive to horizontal forces exerted generally orthogonally to the sensing direction 1112.

The mobile apparatus 1100 further includes a stabilizing assembly 1114 coupled between the container 1106 and the frame 1102. The stabilizing assembly 1114 inhibits shifting of the container 1106 relative to the frame 1102 in at least a first shifting direction generally perpendicular to the sensing direction, while simultaneously permitting force transfer from the container 1106 toward the frame 1102 in the sensing direction.

In the example illustrated, the at least one sensor assembly 1110 includes a front left sensor assembly 1110*a* and a front right sensor assembly 1110*b*, each of the same construction as the front right and left sensor assemblies 110*a*, 110*b* of the mobile apparatus 100.

The sensor assembly 1110 further includes rear left and rear right sensor assemblies 1110*c* and 1110*d*. Each rear sensor assembly 1110*c*, 1110*d* forms part of a support assembly 1230.

Figure 11:
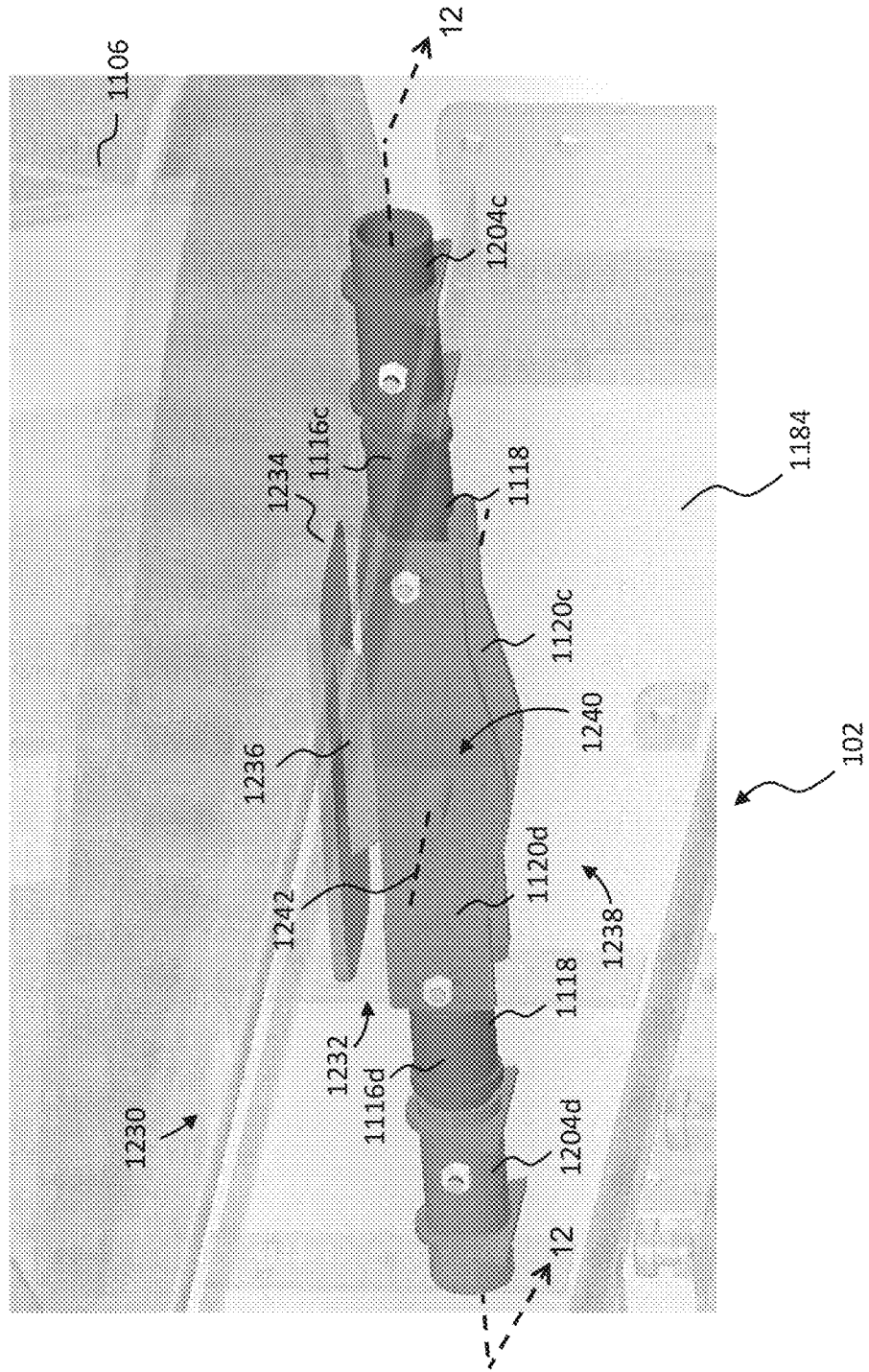
FIG. 11 is an enlarged perspective view of portions of the mobile apparatus of FIG. 10.

Referring to FIG. 11, the support assembly 1230 includes a pivot lug 1232 having a top surface secured to an underside surface of the container 1106 near a laterally central and longitudinally rearward end of the container 1106. In the illustrated example, the pivot lug 1232 includes a planar base flange 1234 and a bracket arm 1236 projecting downward from the base flange 1234.

The support assembly 1230 further includes a connector link 1238 pivotably secured to the bracket arm 1236 at a pivot joint 1240 defining at least in part a pivot lug axis 1242. The connector link 1238 has a first link arm 1120*c* and a second link arm 1120*d* extending laterally outwardly from opposed sides of the pivot lug axis 1242. A rear load cell 1116*c* (e.g. left rear load cell 1116*c*) is secured to first link arm 1120*c* at a first end 1118*c* of the load cell 1116*c*.

Figure 12:
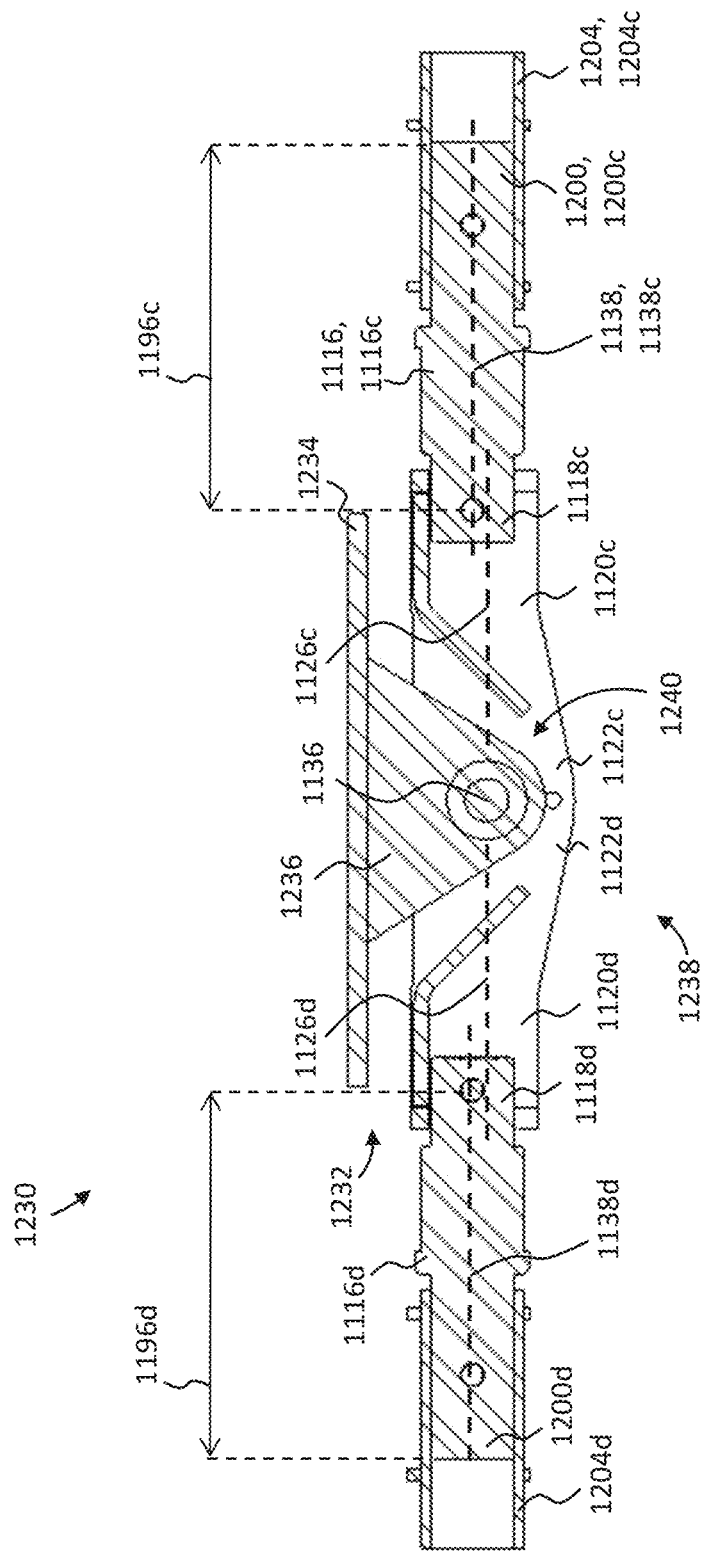
FIG. 12 is a cross section of a support apparatus of the mobile apparatus of FIG. 10, taken along line 12-12 of FIG. 11.

Referring to FIG. 12, the load cell 1116*c* has a cell second end 1200*c* spaced apart from the cell first end 1118*c* along the cell axis 1138*c* by a cell length 1196*c*. The cell second end 1200*c* is, in the example illustrated, coupled to a second one of the frame 1102 and the container 1106, the second one different than the first one. In the illustrated example, the cell second end 1200*c* is coupled to the frame 1102, via a frame mount 1204*c*. The frame mount 1204*c* is fixed to a structural beam 1184 of the frame 1102, and the cell second end 1200*c* of the load cell 1116*c* is fixed to the frame mount 1204*c*.

The sensor assembly further includes a second rear load cell, identified as right rear load cell 1116*d*. The right rear load cell 1116*d* is mounted in the same configuration as the left rear load cell 1116*c*.

In the example illustrated, the cell axis 1138*c*, 1138*d* of each rear load cell 1116*c*, 1116*d* is oriented generally orthogonal to the sensing direction, and in the example illustrated generally horizontal and perpendicular to the longitudinal axis 1108. Each link arm 1120*c*, 1120*d* has a respective link axis 1126*c*, 1126*d* that is oriented parallel to the cell axis. The inner ends of each link arm 1120*c*, 1120*d* correspond to link first ends 1122*c*, 1122*d* that are pivotably secured to the container 1106 at the lug pivot axis 1242. The pivot joint 1240 includes a pivot joint centerpoint 1136.

Figure 13:
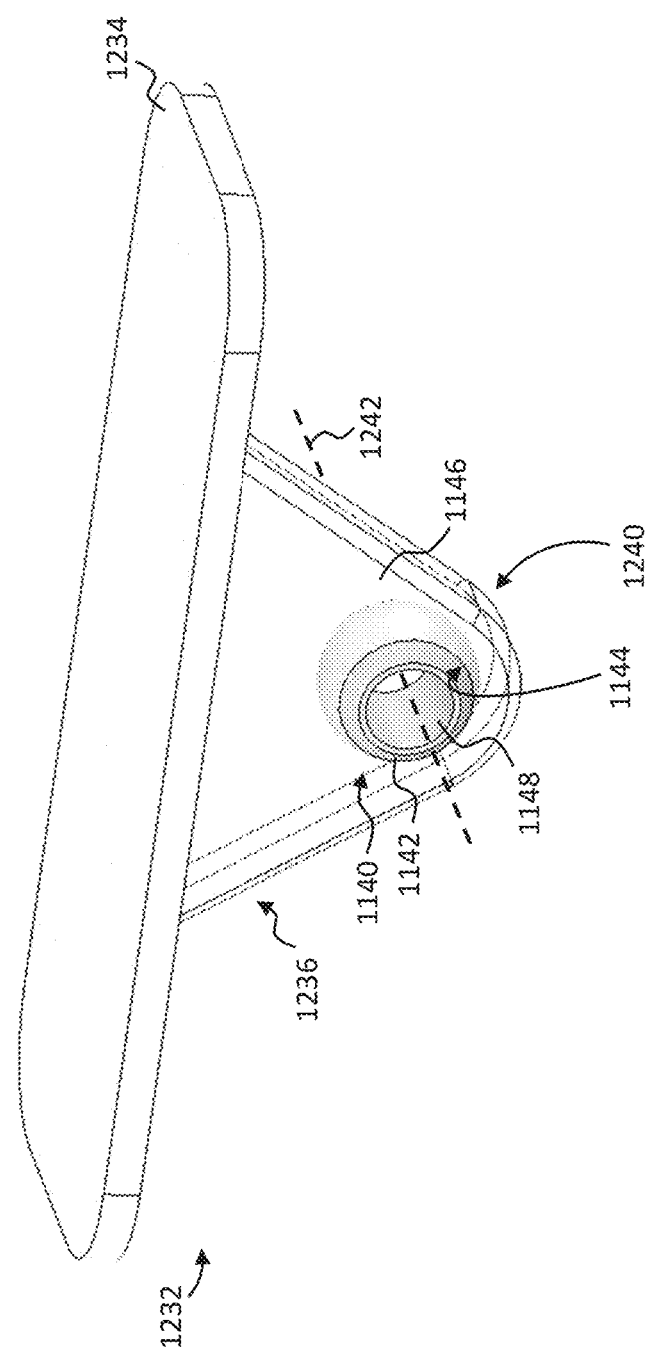
FIG. 13 is a top perspective view of a pivot lug of the mobile apparatus of FIG. 10.

Referring to FIG. 13, the pivot joint 1240 includes a pivot joint bushing 1140 having an outer spherical surface 1142 disposed about the pivot joint centerpoint 1136 and retained in sliding engagement with an inner spherical surface 1144 of a pivot joint bushing seat 1146 fixed to the bracket arm 1236. A pivot joint bore 1148 passes through the pivot joint bushing 1140, the pivot joint bore 1148 coaxial with the pivot joint axis 1242.

Figure 14:
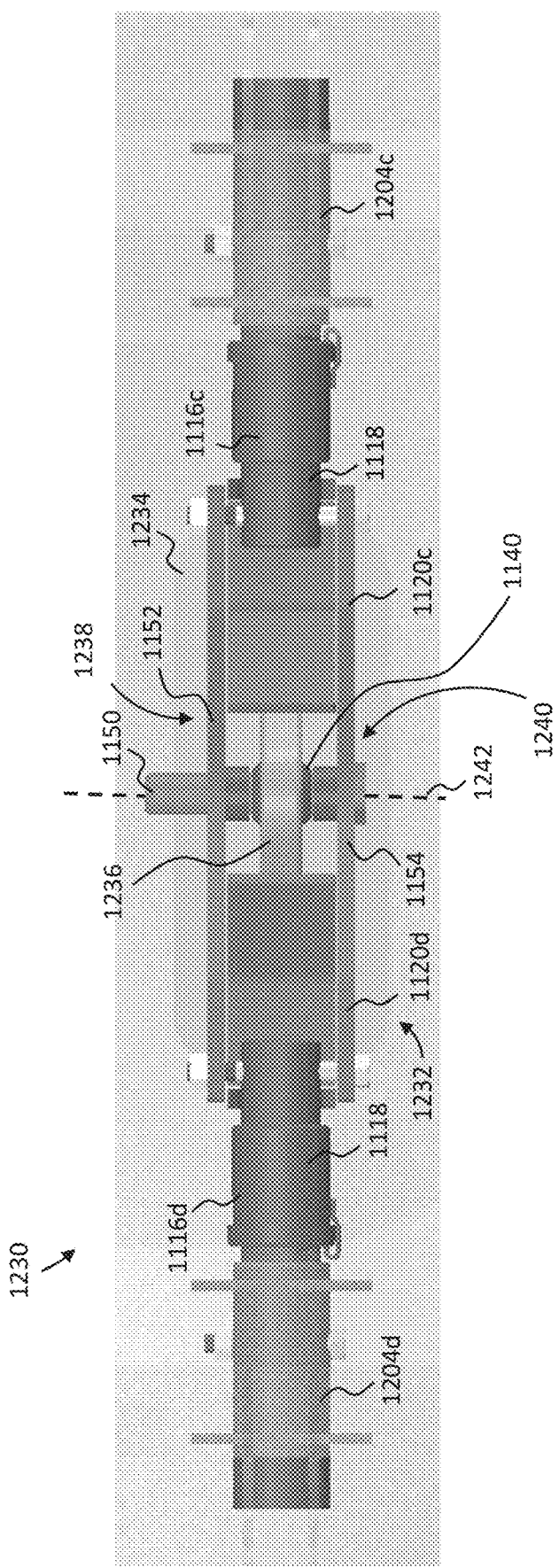
FIG. 14 is an enlarged bottom plan view of portions of the mobile apparatus of FIG. 10.

Referring to FIG. 14, a pivot joint pin 1150 is received in the pivot joint bore 1148. The pivot joint pin 1150 is held in position relative to the cell first ends 1118*c*, 1118*d* by a pair of opposed flanges 1152, 1154 fixed to the connector link 1238.

The pivot joint bushing 1140 and pivot joint centerpoint 1136 deflect vertically downward in response to increasing the weight of the load in the container 1106. The pivot joint pin 1150 inserted through the pivot joint bushing 1140 correspondingly deflects downward with the bushing 1140. This downward force is transferred to the cell first ends 1118*c*, 1118*d* of the load cells 1116*c*, 1116*d* via opposed flanges 1152, 1154 of the connector link 1238 which straddle the pivot joint bushing 1140 and support opposed ends of the pivot joint pin 1150. The pivot joint pin 1150 is oriented generally parallel to the longitudinal axis 1108. Movement of the bushing seat 1146 of the bracket arm 1236 relative to the spherical surface 1142 of the pivot joint bushing 1140 can further facilitate the sensor assembly freely accommodating horizontal error forces to filter out such forces from the weight measurement returned by the sensor assemblies 1110*c*, 1110*d*.

Referring again to FIG. 10, the stabilizing assembly 1114 includes at least one tie 1210. In the example illustrated, the at least one tie includes a first lateral tie 1210*a*. The first lateral tie 1210*a* has a tie first end 1214 and a tie second end 1216 spaced apart from the tie first end 1214 along a tie axis 1218. The tie axis 1218 of the tie 1210*a* is oriented orthogonal to the sensing axis. In the example illustrated, the tie first end 1214 of the tie 1210*a* is coupled to the frame 1102 via a tie first pivot joint 1220, and the tie second end 1216 of the tie 1210*a* is coupled to the container 1106 via a tie second pivot joint 1222. Each of the tie first and tie second pivot joints 1220, 1222 define a respective horizontal tie first and tie second pivot axis 1224, 1226 oriented orthogonal to the tie axis. Pivoting of the tie 1210*a* about the tie pivot axes 1224, 1226 can help the stabilizing assembly 1114 to accommodate force transfer from the container 1106 toward the frame 1102 in the sensing direction.

The mobile apparatus 100, 1100 may be used in a method of preparing a feedstock ration having a plurality of ingredients.

In one example, the method includes dispensing a first ingredient into a container 106 supported on a mobile frame 102, wherein a plurality of the sensor assemblies 110 are coupled between the frame 102 and the container 106 for measuring a weight of contents of the container 106 by sensing a force exerted by the container 106 towards the frame 102 in a generally vertical sensing direction 112.

The method includes monitoring a first weight of the first ingredient in the container 106 as indicated by the sensing assemblies 110 while the first ingredient is being loaded into container 106, and comparing the monitored first weight to a target first weight corresponding to an amount of the first ingredient required for the feedstock ration. The method includes stopping the loading of the first ingredient into the container 106 when the first weight reaches the target first weight.

The method further includes loading a second ingredient into the container 106. The method includes monitoring a second weight of the second ingredient in the container 106 as indicated by the sensing assemblies 110 while the second ingredient is being loaded into container 106, and comparing the monitored second weight to a target second weight corresponding to an amount of the second ingredient required for the feedstock ration. The method includes stopping the loading of the second ingredient into the container 106 when the second weight reaches the target second weight.

In some examples, the method further includes loading a third or subsequent ingredient into the container 106. Such methods include monitoring a third or subsequent weight of the third or subsequent ingredient in the container 106 as indicated by the sensing assemblies 110 while the third or subsequent ingredient is being loaded into container 106, and comparing the monitored third or subsequent weight to a target third or subsequent weight corresponding to an amount of the third or subsequent ingredient required for the feedstock ration. A method which includes loading a third or subsequent ingredient into container 106 includes stopping the loading of the third or subsequent ingredient into the container 106 when the third or subsequent weight reaches the target third or subsequent weight. Ingredients may be added until each of the plurality of ingredients have been added to the feedstock The method may also include moving the mobile frame 102 to a first location prior to loading the first ingredient into the container, and after stopping the loading of the first ingredient, moving the mobile frame 102 to a second location remote from the first location prior to loading the second ingredient into the container.

We claim:

1. A mobile apparatus for carrying and weighing a load, comprising:
   a) a mobile frame supported by a plurality of wheels;
   b) at least one container supported on the mobile frame for carrying a load;
   c) a plurality of sensor assemblies coupled between the frame and the container, the sensor assemblies resistive to a weight force exerted by the container towards the frame in a generally vertical sensing direction for sensing a weight of the load, and the sensor assemblies non-resistive to error forces exerted generally orthogonally to the sensing direction for filtering out the error forces from the sensed weight; and
   d) a stabilizing assembly separate from the sensor assemblies and coupled between the container and the frame, the stabilizing assembly freely accommodating transfer of the force exerted by the container towards the frame in the sensing direction, and simultaneously inhibiting shifting of the container relative to the frame in one or more shifting directions perpendicular to the sensing direction.

2. The apparatus of claim 1, wherein each sensor assembly comprises a load cell having a cell first end, and a connector link having a link first end coupled to the cell first end at a first joint.

3. The apparatus of claim 2, wherein the connector link has a link axis and a link second end spaced apart from the link first end along the link axis by a link length, the link second end pivotally connected to a first one of the frame and container at a second joint.

4. The apparatus of claim 3, wherein the second joint is configured to resist movement of the connector link in the sensing direction relative to the first one of the frame and the container, and to accommodate movement of the load cell relative to the second joint resulting from bending of the frame relative to the container.

5. The apparatus of claim 3, wherein the first joint is configured to resist movement of the connector link in the sensing direction relative to the first one of the frame and the container, and to accommodate movement of the load cell relative to the second joint resulting from bending of the frame relative to the container.

6. The apparatus of claim 3, wherein the load cell has a cell axis and a cell second end spaced apart from the cell first end along the axis, the cell second end coupled to a second one of the frame and container, the second one different than the first one.

7. The apparatus of claim 6, wherein the cell axis of the load cell of each sensor assembly is oriented orthogonal to the sensing axis.

8. The apparatus of claim 7, wherein the frame extends lengthwise along a longitudinal axis, and the cell axis of the load cell of each sensor assembly is oriented parallel to the longitudinal axis.

9. The apparatus of claim 3, wherein the link axis of the connector link of each sensor assembly is parallel to the sensing axis.

10. The apparatus of claim 1, wherein the stabilizing assembly comprises at least one tie, each of the at least one tie having a tie length extending between a tie first end and a tie second end spaced apart from the tie first end along a tie axis, the tie axis oriented orthogonal to the sensing axis with the tie first end coupled to the frame and the tie second end coupled to the container, wherein shifting of the container relative to the frame in a direction parallel to the tie axis is inhibited.

11. The apparatus of claim 10, wherein the first tie end is coupled to the frame via a first tie pivot joint, and the second tie end is coupled to the container via a second tie pivot joint, each of the first and second tie pivot joints defining a respective horizontal first and second tie pivot axis oriented orthogonal to the tie axis, wherein pivoting of the tie about tie pivot axes freely accommodates transfer of the force from the container toward the frame in the sensing direction.

12. The apparatus of claim 11, wherein the at least one tie includes a first lateral tie, the tie axis of the first lateral tie extending orthogonal to the longitudinal direction, wherein shifting of the container relative to the frame in the lateral direction is inhibited by the first lateral tie.

13. The apparatus of claim 12, wherein the first lateral tie is disposed adjacent a forward end of the frame.

14. The apparatus of claim 13, wherein in the at least one tie includes a second lateral tie oriented parallel to the first lateral tie, the second lateral tie disposed adjacent a rearward end of the frame.

15. The apparatus of claim 11, wherein the at least one tie includes a first longitudinal tie, the tie axis of the first longitudinal tie oriented parallel to the longitudinal axis, wherein shifting of the container relative to the frame parallel to the longitudinal axis is inhibited by the first longitudinal tie.

16. The apparatus of claim 1, wherein the load cell is a bending beam load cell.

17. A method of preparing a feedstock ration having a plurality of ingredients, the method comprising:
   a) loading a first ingredient of a feedstock ration into a container supported on a mobile frame, wherein a plurality of sensor assemblies are coupled between the frame and the container for measuring a weight of contents of the container by sensing a force exerted by the container towards the frame in a generally vertical sensing direction, each sensor assembly including a load cell having a cell first end, and a connector link having a link first end coupled to the cell first end at a first joint and a link second end pivotally connected to a first one of the frame and the container at a second joint, and wherein a stabilizing assembly separate from the sensor assemblies is coupled between the container and the frame, the stabilizing assembly freely accommodating transfer of the force exerted by the container towards the frame in the sensing direction, and simultaneously inhibiting shifting of the container relative to the frame in one or more shifting directions perpendicular to the sensing direction;
   b) during step (a), monitoring a first weight of the first ingredient in the container as indicated by the sensing assemblies, and comparing the monitored first weight to a target first weight corresponding to an amount of the first ingredient required for the feedstock ration;
   c) when the first weight reaches the target first weight, stopping the loading of the first ingredient into the container; and
   d) after step (c), repeating steps (a) (c) for a second ingredient in place of the first ingredient.

18. The method of claim 17, further comprising repeating steps (a) to (c) for subsequent ingredients, until each of the plurality of ingredients have been added to the feedstock.

19. The method of claim 17, further comprising moving the mobile frame to a first location prior to loading the first ingredient into the container, and after step (c) and before step (d), moving the mobile frame to a second location remote from the first location prior to loading the second ingredient into the container.

20. The method of claim 17, wherein during the loading of ingredients in step (a), each sensor assembly resists the force exerted by the container towards the frame to transfer the force to the load cell, and each sensor assembly freely accommodates forces orthogonal to the sensing direction to isolate the load cell from error forces.

* * * * *